United States Patent [19]
Nagata et al.

[11] Patent Number: 6,115,186

[45] Date of Patent: Sep. 5, 2000

[54] SCANNING TYPE IMAGE VIEWING OPTICAL SYSTEM

[75] Inventors: Hideki Nagata, Kobe; Kohtaro Hayashi, Toyonaka; Ichiro Kasai, Kawachinagano; Soh Ohzawa, Toyonaka; Akira Sato, Shiga-Ken; Yasushi Kobayashi, Itami, all of Japan

[73] Assignee: Minolta Co., Ltd., Osaka, Japan

[21] Appl. No.: 09/315,627

[22] Filed: May 20, 1999

[30] Foreign Application Priority Data

May 26, 1998 [JP] Japan .................................. 10-143851

[51] Int. Cl.⁷ .................................................. G02B 27/14
[52] U.S. Cl. .............................................. 359/630; 359/633
[58] Field of Search .................................... 359/369, 385, 359/629, 630, 633; 351/211

[56] References Cited

U.S. PATENT DOCUMENTS

| | | | |
|---|---|---|---|
| 4,012,109 | 3/1977 | Freeman | 359/369 |
| 4,099,831 | 7/1978 | Freeman | 359/369 |
| 5,334,991 | 8/1994 | Wells et al. | 345/8 |
| 5,557,444 | 9/1996 | Melville et al. | 359/199 |
| 5,657,165 | 8/1997 | Karpman et al. | 359/634 |
| 5,993,000 | 11/1999 | Kobayashi et al. | 351/211 |

*Primary Examiner*—Ricky Mack
*Attorney, Agent, or Firm*—Sidley & Austin

[57] ABSTRACT

A scanning-type image viewing optical system has a light source for emitting luminous flux; a main scanning means for scanning luminous flux in a first direction; a sub-scanning means for scanning luminous flux in a second direction different from the first direction; and an eyepiece lens for directing luminous flux scanned by the two scanning means to the pupil of an observer, wherein the main scanning means has a conjugate relationship with the pupil position of the observer via the eyepiece lens, and when the pupil diameter, i.e., the luminous flux diameter of the incident luminous flux at the pupil position of the observer, is designated d and the main scan diameter, i.e., the luminous flux diameter exiting the main scanning means, is designated d', the conjugate magnification β calculated by d/d' satisfies the conditional equation $\beta \leq 0.85$.

6 Claims, 4 Drawing Sheets

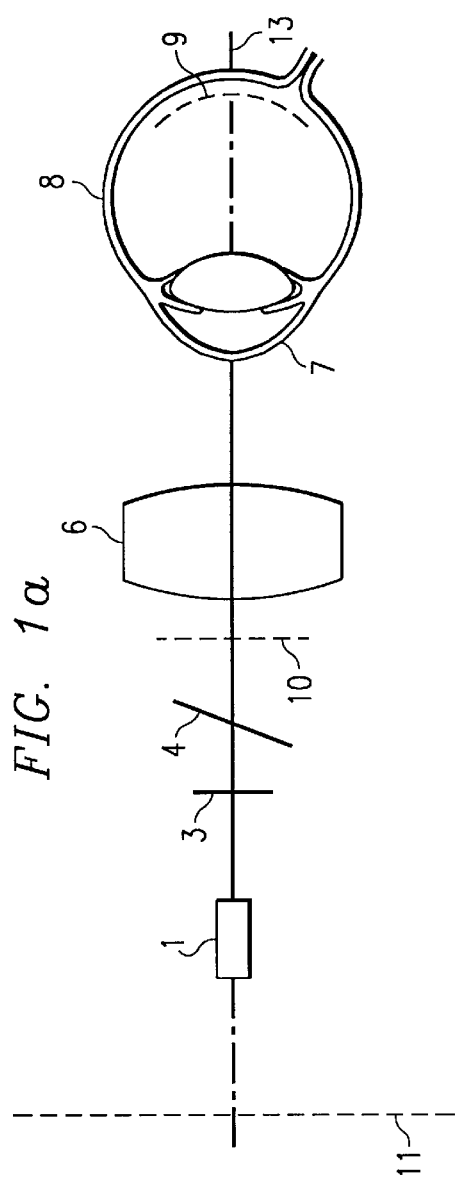
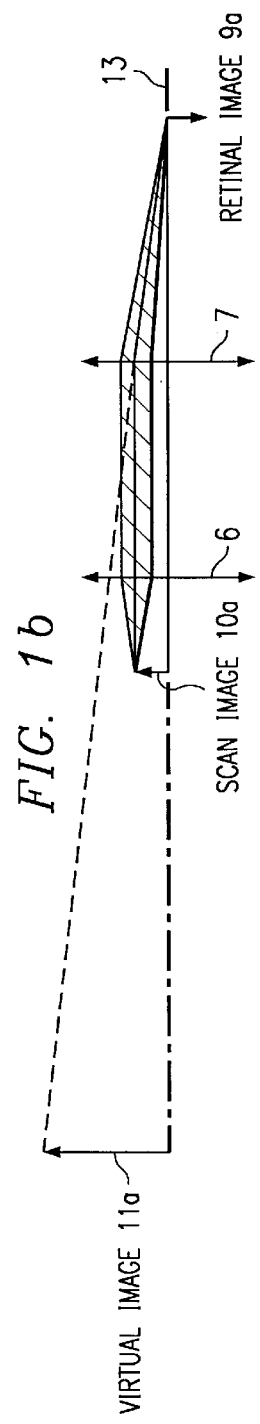

SCANNING TYPE IMAGE VIEWING OPTICAL SYSTEM

CROSS-REFERENCE OF RELATED APPLICATIONS

This application is based on Application No. 10-143851 filed in Japan, the content of which is hereby incorporated by reference.

FIELD OF THE INVENTION

The present invention relates to a scanning-type image viewing optical system, and specifically relates to a scanning type image viewing optical system which provides an image to an observer by scanning luminous flux emitted from a light source on the pupil of the observer using the after image of the observer, this system being for use in, for example, head-up displays and head-mounted displays.

DESCRIPTION OF THE RELATED

FIG. 3 is a structural diagram of a conventional scanning-type image viewing optical system. In FIG. 3, the luminous flux emitted from a light source 1 is modulated to a light intensity by a modulator 2, and impinges a first scanning mirror 3. The first scanning mirror 3 is supported by a center rotating shaft 3a so as to be rotatable, and rotates at a predetermined amplitude and frequency. The incident luminous flux is reflected and simultaneously scans in a first scan direction via this mirror rotation.

The luminous flux scanned by the first scanning mirror 3 impinges a second scanning mirror 4. The second scanning mirror 4 has a rotating shaft 4a perpendicular to the rotating shaft 3a of the first scanning mirror 3, and rotates at a predetermined amplitude and frequency. The incident luminous flux is reflected and simultaneously scans in a second scan direction via this mirror rotation. In this optical system, the first scanning direction and the second scanning direction are mutually perpendicular.

The luminous flux scanned via the first and second scanning mirrors 3 and 4 is reflected by a semitransparent surface 5, and enters the eyepiece 6. One surface of the eyepiece 6 is a reflective surface 6a, which bends the luminous flux again to the semitransparent surface 5 side. The bent luminous flux passes through the semitransparent surface 5, and impinges the pupil 7 of an observer. A projection image is observed by the observer via the after image. Since this image viewing optical system does not use a two-dimensional display element such as a liquid crystal display element, it can provide a highly detailed projection image without being affected by the several number of pixels of the display element.

The scanning determined by the scanning mirrors 3 and 4 when displaying a specific projection image via the image viewing optical system of the aforesaid construction is described below with reference to FIG. 4. Hypothetically consider displaying an image of high-vision equivalence. The aspect ratio of a high-vision image is 16:9, the number of frame that must be displayed per second is 60 frames, and approximately 1,000 horizontal scan lines are required.

The scanning frequency in the horizontal direction is 60 kHz, determined by the number of horizontal scan lines multiplied by the number of frames, and the number of vertical scan lines is 60 Hz determined by the number of frames. In this way, the required scanning frequency is relatively greater in the horizontal direction compared to the vertical direction, and the required scanning angle is also greater in the horizontal direction, such that scanning in the horizontal direction must be overwhelmingly fast. In general, scanning in the horizontal direction is termed the main scan, and scanning in the vertical direction is termed the sub-scan.

Since the second scanning mirror 4 is optically disposed behind the first scanning mirror 3 in the optical system of the conventional art shown in FIG. 3, the second scanning mirror 4 must be constructed larger than the first scanning mirror 3 since the scanning angle must be sufficiently large to cover the first scanning mirror 3. Accordingly, the first scanning mirror 3 used for the main scan is generally as small as possible.

In a conventional image viewing optical system, in order for the first scanning mirror 3, which performs the main scan, to be constructed as small as possible, is constructed so as to be disposed at a conjugate position to the pupil 7.

FIG. 2(a) briefly shows the relationships among the pupil d0, angle of field a0, main scan diameter d'0, and scan angle a'0 when the conjugate magnification $\beta$ calculated by the pupil diameter/main scan diameter is 1 (equal magnification) in an optical system in which the main scanning member is arranged at a position having a conjugate relationship to the pupil. The angle of field and the scan angle are the incidence angle of the extra off-axial rays 12 at the pupil 7 position and the exit angle of the extra off-axial rays 12 at the main scanning member 3 position, respectively. The pupil diameter and the main scan diameter are the luminous flux diameters at the pupil 7 position and at the main scanning member 3 position, respectively. The viewable projection image range increases as the angle of field becomes larger, and the viewable pupil position range increases as the pupil diameter becomes larger.

FIG. 2(a) schematically shows the layout of a conventional optical system. In FIG. 2(a), the conjugate magnification $\beta$ is 1, such that d0=d'0. At the same time, a0=a'0. In a conventional optical system with specific pupil diameter and angle of field, the main scanning member is constructed so as to rotate with a large number of oscillations, which makes it difficult to increase the scanning speed for high resolution display, such that the values of both the main scan diameter and the scan angle are averaged to reduce the main scan diameter and the scan angle.

Furthermore, in a conventional scanning-type image viewing optical system, the scan angle is increased to obtain an adequate angle of field, thereby making it difficult to produce the high number of oscillations necessary for a high resolution display.

SUMMARY OF THE INVENTION

An object of the present invention is to provide an improved scanning-type image viewing optical system.

A further object of the present invention is to provide a scanning-type image viewing optical system capable of reducing the scan angle of the main scanning member.

These objects are attained by a scanning-type image viewing optical system comprising:

a light source for emitting luminous flux; a main scanning means for scanning luminous flux in a first direction; a sub-scanning means for scanning luminous flux in a second direction different from the first direction; and an eyepiece lens for directing luminous flux scanned by the two scanning means to the pupil of an observer, wherein the main scanning means has a conjugate relationship with the pupil position of the observer via the eyepiece lens, and when the pupil diameter, i.e., the luminous flux diameter of the incident luminous flux at the pupil position of the observer, is designated d and the main scan diameter, i.e., the luminous flux diameter exiting the main scanning means, is designated d', the conjugate relationship β calculated by d/d' satisfies the conditional equation β≦0.85.

BRIEF DESCRIPTION OF THE DRAWINGS

These and other objects and features of this invention will become clear from the following description, taken in conjunction with the preferred embodiments with reference to the accompanying drawings, in which:

FIG. 1(a) is a layout diagram showing the arrangement of the structural elements of the optical system of the present invention on a linear optical axis;

FIG. 1(b) shows the positional relationship in the construction of FIG. 1(a).

DESCRIPTION OF THE PREFERRED EMBODIMENT

Figure 3:
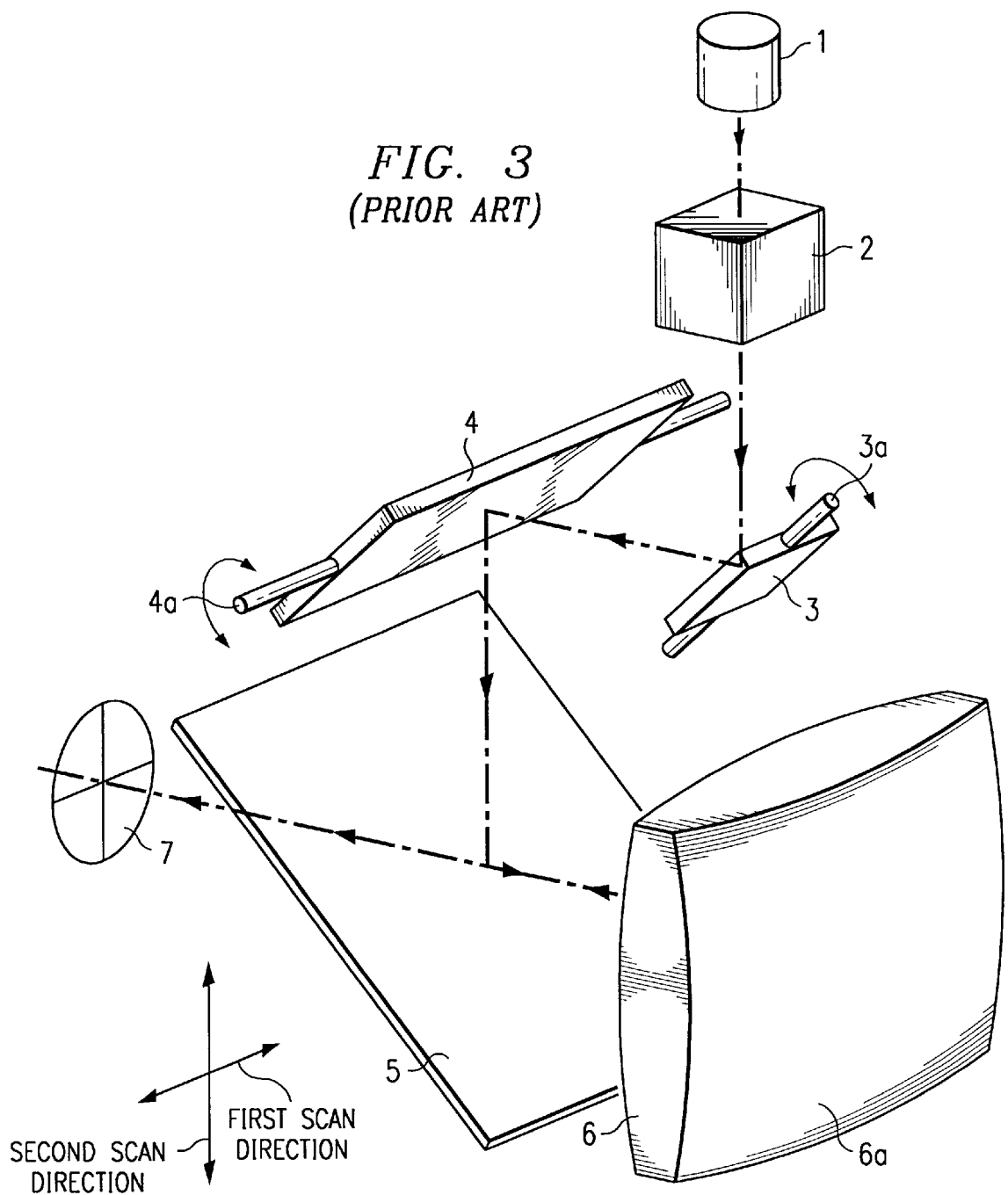
FIG. 3 is a structural view of a scanning-type image viewing optical system common to both the conventional art and the present invention.
Figure 4:
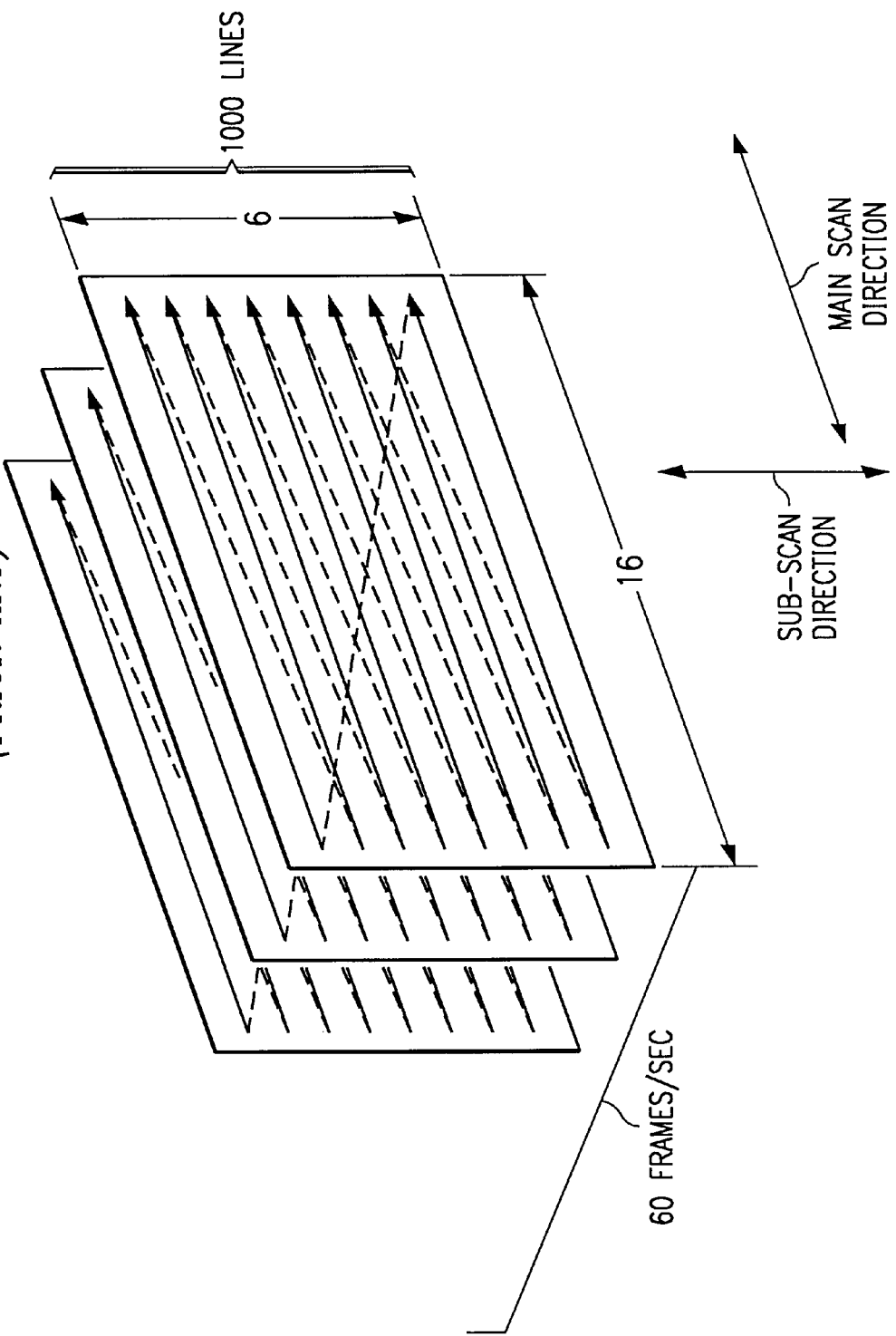
FIG. 4 illustrates the display of a high-vision equivalent image.

A perspective view showing the general construction of the scanning-type image viewing optical system of the present embodiment common also to the conventional is shown in FIG. 3. FIG. 1(a) is a layout diagram briefly showing the structural elements of the scanning-type image viewing optical system of FIG. 3 viewed on line 13 which represents the optical axis in FIG. 3.

The luminous flux emitted from the light source 1 is scanned by the main scanning mirror 3 and the sub-scanning mirror 4, and subsequently form a scan image at the scan image forming position. The luminous flux forming the scan image arrives at the pupil 7 of an observer via the eyepiece lens 6, and forms a retinal image on the retina 9 of the eyeball 8. The observer views a virtual image at the virtual image position 11 via the retinal image. FIG. 1(b) illustrates the relationships among the retinal image 9a, the scan image 10a, the virtual image 11a, the eyepiece lens 6, and the pupil lens 7.

FIG. 1 does not show the strict layout positions of each structural element, but rather shows the optically approximate relationships among the structural elements. In the present embodiment, the main scanning mirror 3 is disposed at a position which is the approximate conjugate position with the pupil 7 through the eyepiece lens 6, and the construction is such that the conjugate magnification β satisfies the conditional equation 0.15≦β≦0.85 in contrast to the conventional example of β=1 shown in FIG. 2(a). By satisfying this condition, the scan angle of the main scanning mirror 3 can be made smaller compared to a conventional scanning-type image viewing optical system.

Figure 2A:
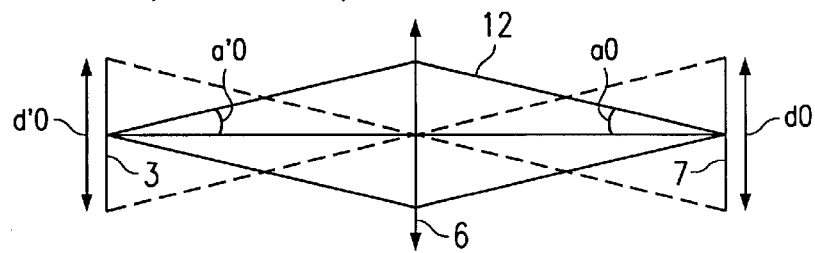
FIG. 2(a) shows the relationships among the pupil diameter, angle of view, main scan diameter, and scan angle in a convention optical system.
Figure 2B:
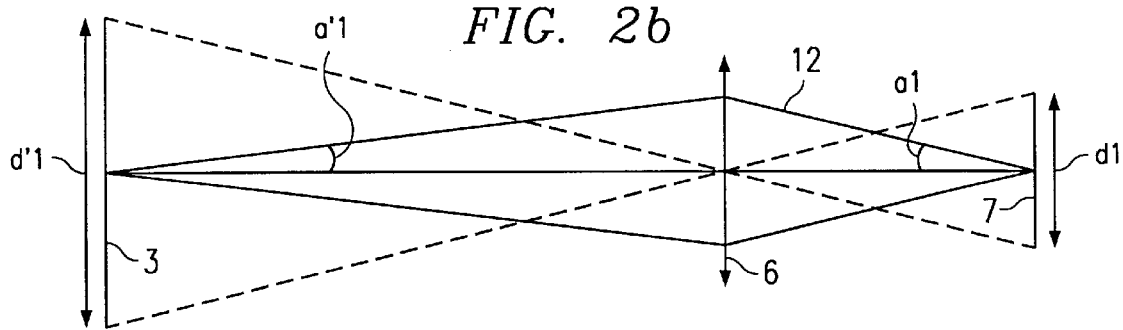
FIGS. 2(b) and 2(c) show the relationships among the pupil diameter, angle of view, main scan diameter, and scan angle in an embodiment of the present invention.
Figure 2C:
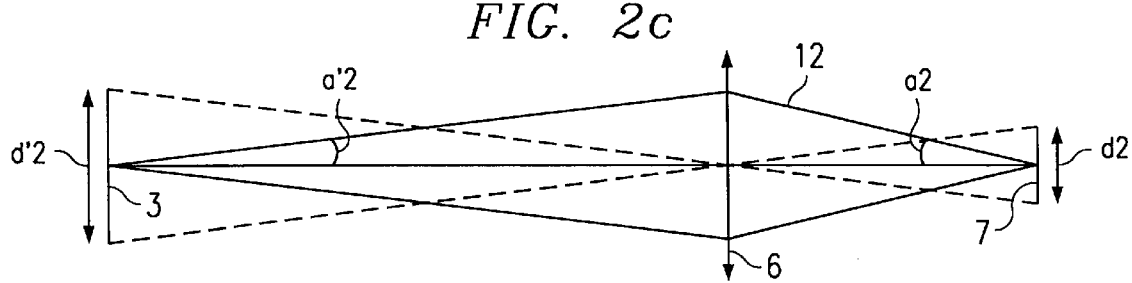

In correspondence to the conventional art shown in FIG. 2(a), FIGS. 2(b) and 2(c) show the relationships among the pupil diameters d1 and d2, angles of field a1 and a2, main scan diameters d'1 and d'2, and scan angles a'1 and a'2 of the scanning-type image viewing optical system of the present embodiment which satisfies the condition 0.15≦β≦0.85. To facilitate comparison, the angle of field in (a), (b), and (c) are identical, i.e., a0=a1=a2.

In FIG. 2(b), the pupil diameter d1 is identical to the pupil diameter d0 of the conventional example. It can be understood from the diagram that the relationship a'1<a0 occurs between the scan angles at this time. Furthermore, the relationship d'1>d'0 also obtains between the main scan diameters at this time.

In FIG. 2(c), the main scan diameter d'2 is identical to the main scan diameter d'0 of the conventional example in FIG. 2(a). It can be understood from the drawing that the relationship a2<a0 between the scan angles. Furthermore, the relationship d2<d0 occurs between the pupil diameters.

Tables 1 and 2 show examples of specific numeric values for the conjugate magnification, the main scan diameter, the pupil diameter, the scan angle, and the angle of field of the present embodiment compared with specific examples of numeric values of the conventional art (corresponds to FIG. 2(a)). Examples 1, 2, and 3 use three different values for the pupil diameter and the main scan diameter and are given as numeric examples of the conventional art, and are identical in Tables 1 and 2. Table 1 shows examples which use the same numeric values for the pupil diameter as are used in the conventional examples 1, 2, and 3, but use different conjugate magnifications (corresponds to FIG. 2(b)). Table 2 shows examples which use the same numeric values for the main scan diameter as are used in the conventional examples 1, 2, and 3, but use different conjugate magnification (corresponds to FIG. 2(c)).

TABLE 1

|  | Conjugate Magnification | Main Scan Diameter | Pupil Diameter | Scan angle | Angle of Field |
|---|---|---|---|---|---|
| Conventional Example 1 | 1.00 | 1.00 | 1.00 | 10.00 | 10.00 |
| Conventional Example 2 | 1.00 | 5.00 | 5.00 | 7.00 | 7.00 |
| Conventional Example 3 | 1.00 | 10.00 | 10.00 | 5.00 | 5.00 |
| Example 1 | 0.67 | 1.50 | 1.00 | 6.70 | 10.00 |
| Example 2 | 0.67 | 7.50 | 5.00 | 4.68 | 7.00 |
| Example 3 | 0.67 | 15.00 | 10.00 | 3.34 | 5.00 |
| Example 4 | 0.50 | 2.00 | 1.00 | 5.04 | 10.00 |
| Example 5 | 0.50 | 10.00 | 5.00 | 3.51 | 7.00 |
| Example 6 | 0.50 | 20.00 | 10.00 | 2.50 | 5.00 |
| Example 7 | 0.20 | 1.00 | 1.00 | 2.02 | 10.00 |
| Example 8 | 0.20 | 5.00 | 5.00 | 1.41 | 7.00 |
| Example 9 | 0.20 | 10.00 | 10.00 | 1.00 | 5.00 |

TABLE 2

|  | Conjugate Magnification | Main Scan Diameter | Pupil Diameter | Scan angle | Angle of Field |
|---|---|---|---|---|---|
| Conventional Example 1 | 1.00 | 1.00 | 1.00 | 10.00 | 10.00 |
| Conventional Example 2 | 1.00 | 5.00 | 5.00 | 7.00 | 7.00 |
| Conventional Example 3 | 1.00 | 10.00 | 10.00 | 5.00 | 5.00 |
| Example 10 | 0.67 | 1.00 | 0.67 | 6.70 | 10.00 |
| Example 11 | 0.67 | 5.00 | 3.33 | 4.68 | 7.00 |
| Example 12 | 0.67 | 10.00 | 6.67 | 3.34 | 5.00 |
| Example 13 | 0.50 | 1.00 | 0.50 | 5.04 | 10.00 |
| Example 14 | 0.50 | 5.00 | 2.50 | 3.51 | 7.00 |
| Example 15 | 0.50 | 10.00 | 5.00 | 2.50 | 5.00 |

TABLE 2-continued

|  | Conjugate Magnification | Main Scan Diameter | Pupil Diameter | Scan angle | Angle of Field |
|---|---|---|---|---|---|
| Example 16 | 0.20 | 1.00 | 0.20 | 2.02 | 10.00 |
| Example 17 | 0.20 | 5.00 | 1.00 | 1.41 | 7.00 |
| Example 18 | 0.20 | 10.00 | 2.00 | 1.00 | 5.00 |

As can be understood from Table 1, when the value of the pupil diameter is the same as in the conventional examples, the main scan diameter can be smaller. This effect becomes more pronounced as the conjugate magnification decreases. On the other hand, it can be understood from Table 2 that the scan angle can be reduced even when the main scan diameter has the same value as in the conventional example. This effect also becomes more pronounced as the conjugate magnification decreases. When the conjugate magnification is excessively small, the pupil diameter becomes so small as to be impractical, and the mirror diameter becomes excessively large and increases the size of the device.

As stated above, the scanning-type image viewing optical system of the present embodiment reduces the scan angle without reducing the pupil diameter and without enlarging the main scanning member. Since high oscillation speeds are readily attained with a smaller scan angle, it is possible for the main scanning member to achieve high-speed oscillation. In this instance, higher resolution images can be displayed.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A scanning-type image viewing optical system comprising:

a light source for emitting luminous flux;

a main scanning means for scanning the luminous flux in a first direction;

a sub-scanning means for scanning the luminous flux in a second direction different from the first direction; and an eyepiece lens for directing the luminous flux scanned by the two scanning means to a pupil of an observer, wherein the main scanning means has a conjugate relationship with the pupil of the observer via the eyepiece lens, and wherein the following condition is fulfilled:
$$\beta \leq 0.85$$
where $\beta$ represents a conjugate magnification calculated by d/d', wherein a pupil diameter is designated d and a main scan diameter is designated d'.

2. A scanning-type image viewing optical system as claimed in claim 1, wherein the following condition is fulfilled:
$$0.15 \leq \beta.$$

3. A scanning-type image viewing optical system as claimed in claim 1, wherein the first direction is perpendicular to the second direction.

4. A scanning-type image viewing optical system as claimed in claim 1, wherein the system includes a modulator for modulating the luminous flux emitting from the light source.

5. A scanning-type image viewing optical system as claimed in claim 1, wherein the system includes a semitransparent surface for reflecting the scanning luminous flux for transmission to the pupil of the observer.

6. A scanning-type image viewing optical device comprising:

a light source for emitting luminous flux;

a modulator for modulating the luminous flux as to form an image;

a main scanning mirror for scanning the luminous flux in a main scanning direction;

a sub-scanning mirror for scanning the luminous flux in a sub-scanning direction perpendicular to the main scanning direction;

a semitransparent surface for reflecting the thus scanned luminous flux for transmission to a pupil of an observer; and an eyepiece lens for directing the scanned luminous flux to the pupil of the observer, wherein the main scanning mirror has a conjugate relationship with the pupil of the observer via the eyepiece lens, and wherein the following condition is fulfilled:
$$\beta \leq 0.85$$
where $\beta$ represents a conjugate magnification calculated by d/d', wherein a pupil diameter is designated d and a main scan diameter is designated d'.

* * * * *